US012296355B2

(12) United States Patent
Puffe et al.

(10) Patent No.: US 12,296,355 B2
(45) Date of Patent: May 13, 2025

(54) DISPENSER

(71) Applicant: Puffe Engineering GmbH, Sankt Augustin (DE)

(72) Inventors: Wolfgang Puffe, Sankt Augustin (DE); Marcel Puffe, Sankt Augustin (DE)

(73) Assignee: Puffe Engineering GmbH, Sankt Augustin (DE)

( * ) Notice: Subject to any disclaimer, the term of this patent is extended or adjusted under 35 U.S.C. 154(b) by 447 days.

(21) Appl. No.: 17/700,455

(22) Filed: Mar. 21, 2022

(65) Prior Publication Data

US 2022/0305518 A1 Sep. 29, 2022

(51) Int. Cl.
*B05C 5/02* (2006.01)

(52) U.S. Cl.
CPC ............ *B05C 5/027* (2013.01); *B05C 5/0245* (2013.01)

(58) Field of Classification Search
CPC ..... B05C 5/027; B05C 5/0275; B05C 5/0279; B05B 5/0245
See application file for complete search history.

(56) References Cited

U.S. PATENT DOCUMENTS

| | | | | |
|---|---|---|---|---|
| 5,875,922 A * | 3/1999 | Chastine | B05C 5/0225 | 335/219 |
| 7,052,548 B2 * | 5/2006 | Jones | B05B 7/1626 | 118/302 |
| 7,056,386 B2 * | 6/2006 | Pahl | B05C 5/0254 | 118/301 |
| 8,939,330 B2 * | 1/2015 | Ross | B05B 7/166 | 239/533.15 |
| 9,914,147 B2 * | 3/2018 | Harris | B05C 5/0279 | |
| 2008/0110939 A1 | 5/2008 | Frates | | |
| 2009/0065611 A1 * | 3/2009 | Harris | B05C 5/0279 | 222/504 |
| 2010/0132612 A1 * | 6/2010 | Achrainer | B05B 15/55 | 118/313 |
| 2013/0084388 A1 * | 4/2013 | Budai | B05C 5/0245 | 427/180 |
| 2020/0222921 A1 * | 7/2020 | Ineichen | B05B 1/3013 | |

FOREIGN PATENT DOCUMENTS

| | | | | |
|---|---|---|---|---|
| DE | 102013101637 | | 8/2014 | |
| EP | 0908240 | | 4/1999 | |
| EP | 1240949 | * | 9/2002 | B05C 5/02 |

OTHER PUBLICATIONS

Office Action issued to German counterpart application No. 102021107264.6, issued Nov. 10, 2021, 13 pages.
Extended European Search Report issued in corresponding EP Application 22159325.4, issued Sep. 21, 2022, 6 pages.

* cited by examiner

*Primary Examiner* — J C Jacyna
(74) *Attorney, Agent, or Firm* — Burris Law, PLLC

(57) ABSTRACT

A dispenser for applying a viscous material, in particular hot melt adhesive, to a substrate, includes: a base body, and a plurality of dispensing modules arranged side by side in series along a lateral axis of the dispenser and attached to the base body. The dispensing modules each have at least one recess which, together with a recess of an adjacent dispensing module, forms a fastening aperture. In each of the fastening apertures a bolt is seated, the bolt is fastened to the base body and is supported on a side of the dispensing modules facing away from the base body against both dispensing modules forming the respective fastening aperture.

14 Claims, 4 Drawing Sheets

DISPENSER

CROSS-REFERENCE TO RELATED APPLICATIONS

This application claims priority to and the benefit of German Patent Application No. DE102021107264.6 filed on Mar. 23, 2021. The disclosure of the above application is incorporated herein by reference.

FIELD

The present disclosure relates to a dispenser for applying a viscous material, in particular hot melt adhesive, to a substrate.

BACKGROUND

The statements in this section merely provide background information related to the present disclosure and may not constitute prior art.

A dispenser is known, for instance, from DE 10 2013 101 637 A1. Dispensers of this type are used in particular for intermittent application of the viscous material in the form of dots or beads to the substrate, for example in the form of a web material, which passes the dispenser.

The dispenser described therein has a plurality of dispensing modules, each comprising a housing. The housings each have a nozzle chamber with a feed channel and an outlet nozzle for the viscous material. Furthermore, a nozzle needle is provided which passes through the nozzle chamber and the tip of which rests on a nozzle needle seat of the outlet nozzle to close it. By means of an actuating device, the nozzle needle can be moved axially along an adjustment axis to open and close the outlet nozzle. The housing has a cylinder chamber in which a piston is axially displaceably guided. This piston cylinder unit is designed as a double-acting pneumatic actuating cylinder and is part of the actuating device for adjusting the nozzle needle. The housing has a rectangular outer profile, transverse to the adjustment axis, so that several dispensing modules can be arranged next to each other in a simple manner, whereby the dispensing modules can rest against each other with side surfaces of the housing.

For fastening the individual dispensing modules, two screws are provided in each case, which are guided on both sides of the cylinder chamber, viewed in the direction of the lateral axis, through fastening apertures in the housing and are screwed into threaded bores in the base body. The screws are supported by a screw head against the housing on a side facing away from the base body in order to clamp the housing against the base body.

The distance between the application nozzles of the individual dispensing modules is determined on the one hand by the width of the piston or the width of the cylinder chamber in the direction of the lateral axis. On the other hand, the distance between the application nozzles is determined by the thickness of the screws or the screw heads for fastening the dispensing modules.

The sizes of the effective piston areas of the piston and thus the width of the cylinder chambers are structurally predetermined to the required forces for closing the outlet nozzle by means of the nozzle needle. Especially when intermittently applying dots of the viscous material at short time intervals, the nozzle needle must be moved quickly, requiring large actuating forces. This requires large piston areas, which in the case of circular piston areas means that the distances between the dispensing modules and thus the distances between the points that can be applied with them in the direction of the lateral axis are relatively large. In DE 10 2013 101 637 A1, it is therefore proposed that the piston surface has a longitudinal extension in the direction of a longitudinal axis that is greater than a width extension in the direction of a lateral axis arranged transversely to the longitudinal axis. However, this requires complex manufacturing of the cylinder bores and pistons.

SUMMARY

This section provides a general summary of the disclosure and is not a comprehensive disclosure of its full scope or all of its features.

According to one form of the disclosure, a dispenser for applying a viscous material, in particular hot-melt adhesive, to a substrate, includes a base body and a plurality of dispensing modules which are arranged in series next to one another along a lateral axis of the dispenser and are attached to the base body. The dispensing modules each have at least one recess which, together with a recess of an adjacent dispensing module, forms a fastening aperture. Furthermore, a bolt is seated in each of the fastening apertures, wherein the bolt is fastened to the base body and is supported on a side of the dispensing modules facing away from the base body against both dispensing modules forming the respective fastening aperture.

This arrangement eliminates the need for two fasteners on the facing sides of two dispensing modules, requiring only one fastener. This allows the width of the dispensing modules in the direction of the lateral axis to be reduced compared to the known prior art dispensing modules. Thus, the distance between applications of the viscous material on the substrate can ultimately also be reduced.

At least one of the bolts can be designed as a screw which is screwed into a threaded bore in the base body and has a screw head with which the screw is supported against the dispensing modules on a side facing away from the base body. Each screw is thus axially supported with the screw head against the two dispensing modules, which together form the fastening aperture in which the screw is seated.

Alternatively, it is also conceivable that the bolt is a threaded bolt which is screwed into a threaded bore in the base body and carries a nut on the side facing away from the base body, which is axially supported against the dispensing modules. This means that no bolt head is provided, but a nut screwed onto the threaded bolt. The threaded bolt can also be firmly connected, for example by a material bond such as welding, soldering, adhesive bonding or the like, to the base body.

The recesses may each be formed in a side surface of the dispensing module housing.

In each case, two dispensing modules arranged next to each other can have facing side walls, which can also be in contact with each other, with the recesses being arranged in the facing side walls.

The recesses may each be formed as a groove in one of the side surfaces of one of the dispensing modules, the groove being open to an adjacent dispensing module. The facing grooves of adjacent dispensing modules thus together form a continuous channel-like opening. The individual grooves can be of any cross-section, for example circular, semicircular or in the form of a polygonal line, such as triangular or rectangular.

The dispensing modules can each have two recesses facing away from each other, so that they each form a fastening aperture with a recess of an adjacent dispensing module. This means that the dispensing modules can be made narrower on two sides.

The fastening apertures can be cylindrical in shape. In one embodiment, the recesses may each be semi-cylindrical in shape for this purpose. It is also conceivable that the recesses have the shape of a circular segment in cross-section, deviating from a semicircle, whereby those recesses which together form a fastening aperture are each formed in cross-section in such a way that the circular segment-shaped cross-sections together form a circular cross-section.

The dispensing modules can each have a fastening surface with which the dispensing modules are held in contact with the base body. The base body may be heated so that contact between the mounting surface and the base body ensures heat transfer from the base body to the dispensing module.

The dispenser may further include end modules attached to the base body at the ends of the row of dispensing modules.

The end modules can each have a recess which forms a fastening aperture with one of the recesses of the respective adjacent dispensing module.

The end modules can each be additionally attached to the base body. For example, they may have a mounting hole in which a mounting screw is located that is screwed into a threaded bore on the base body.

Alternatively, it is also conceivable that instead of the fastening screw, a fastening bolt in the form of a threaded bolt is provided, which is screwed into a threaded bore in the base body and carries a nut on the side facing away from the base body, which is axially supported against the end module. This means that no bolt head is provided, but a nut screwed onto the threaded bolt. The threaded bolt can also be firmly connected, for example by a material bond, to the base body.

In principle, the bolt, regardless of its design, can pass through the fastening apertures in one direction transverse to the lateral axis in each case.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
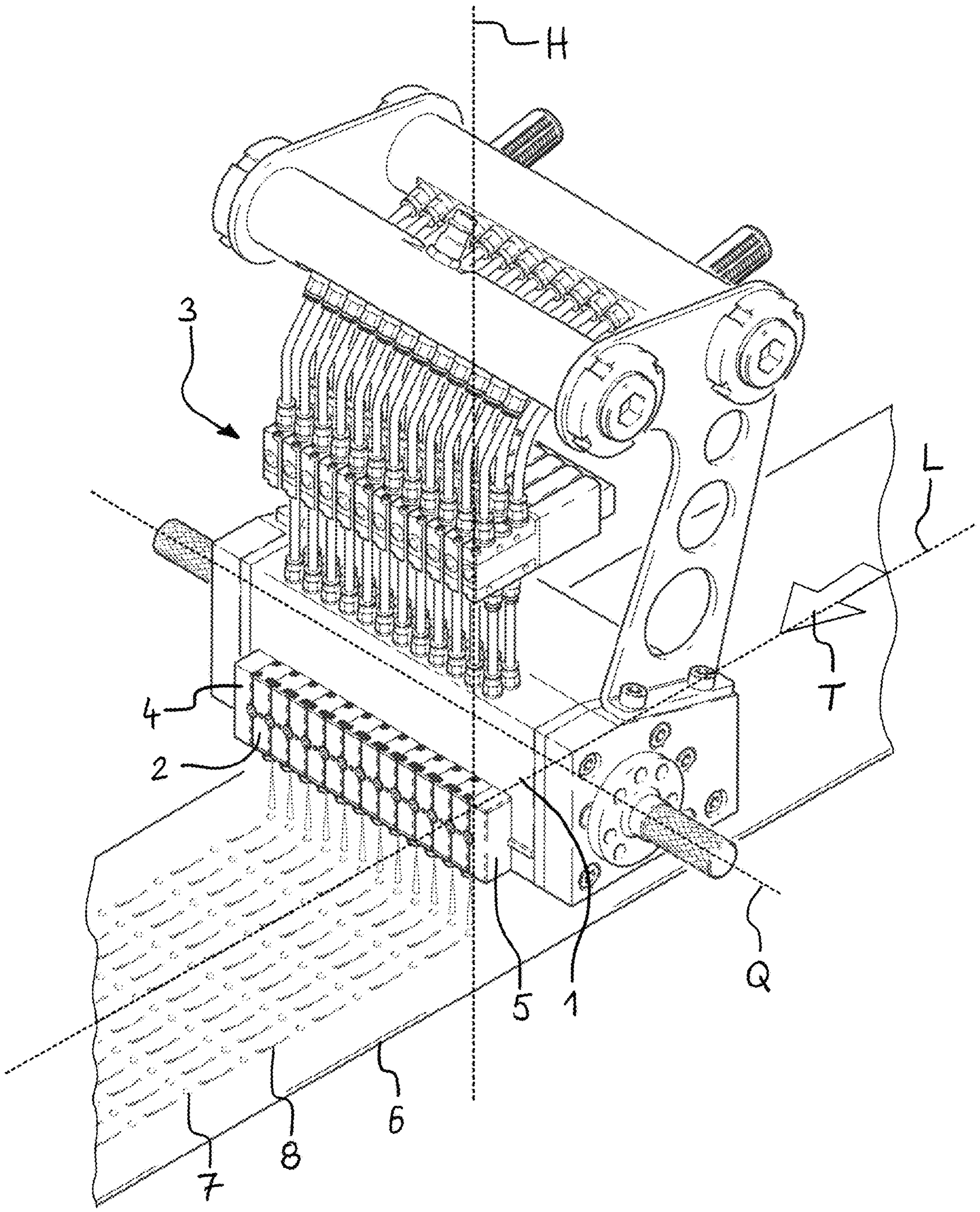
FIG. 1 is a perspective view of a dispenser with a substrate in the form of a carrier web onto which viscous material, e.g. hot melt adhesive, is applied constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a perspective view of a dispenser with a base body 1 extending in the direction of a lateral axis Q. A plurality of dispensing modules 2 are arranged in a row next to each other along the lateral axis Q on the base body 1 and are attached to the base body 1. The individual dispensing modules 2 are supplied with viscous material, in particular hot melt adhesive, via the base body 1. Supply channels (not shown) are arranged in the base body 1 for this purpose. In addition, the dispensing modules 2 are supplied with compressed air via the base body 1 in order to actuate them. For this purpose, a compressed air supply 3 is connected to the base body 1, with compressed air ducts (not shown) in the base body 1 connecting the compressed air supply 3 to the dispensing modules 2.

An end module 4, 5 is attached to the base body 1 at each end of the row of dispensing modules 2. The end modules 4, 5 are "blind modules" which are not used for applying viscous material. Their sole purpose is to attach the dispensing modules to the ends of the row of dispensing modules 2, as will be explained in more detail below.

The dispenser is arranged in such a way that, relative to a vertical axis H running perpendicular to the lateral axis Q, a carrier web 6 is moved under the dispenser in the direction of a transport direction T, adhesive dots 7 and/or adhesive strips 8 being applied to the carrier web 6 by the dispensing modules 2 during the movement of the carrier web 6. The transport direction T runs parallel to a longitudinal axis L, which is arranged perpendicular to the lateral axis Q and the vertical axis H.

Figure 2:
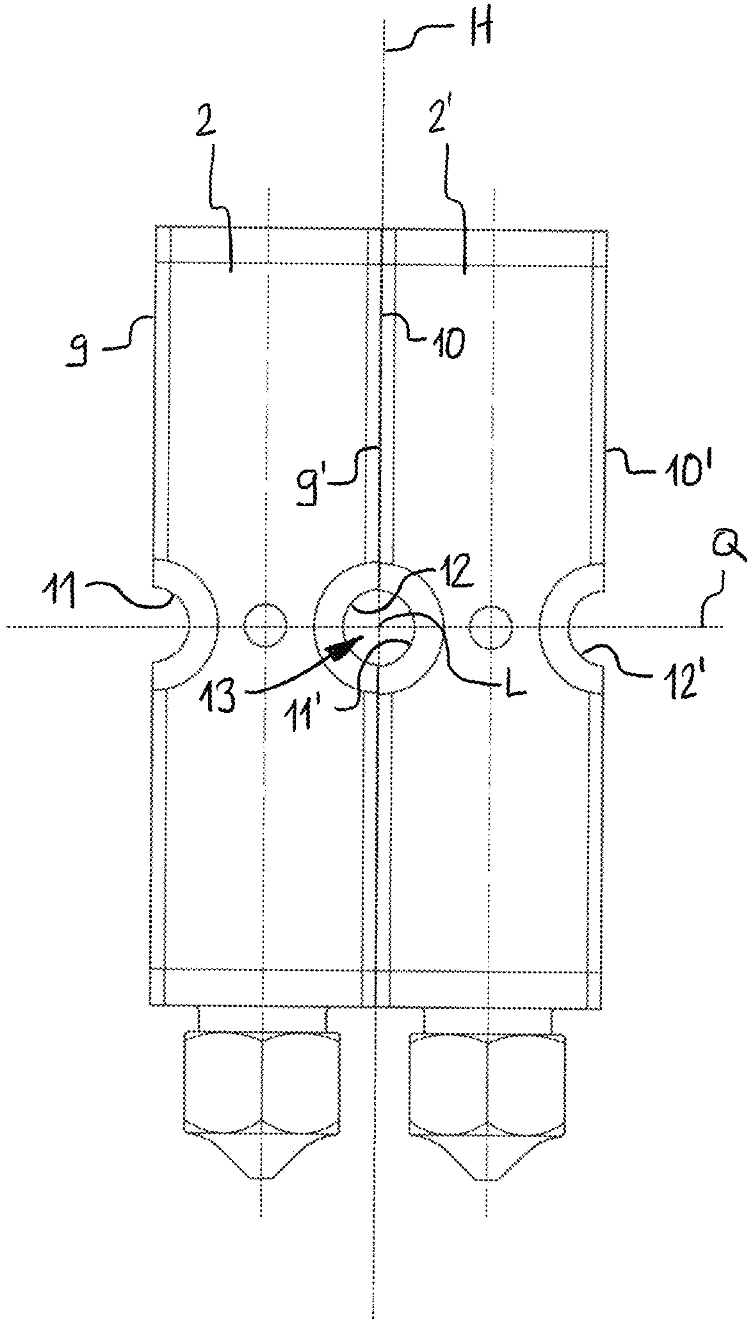
FIG. 2 is a front view of two adjacent dispensing modules as shown in FIG. 1.
Figure 3:
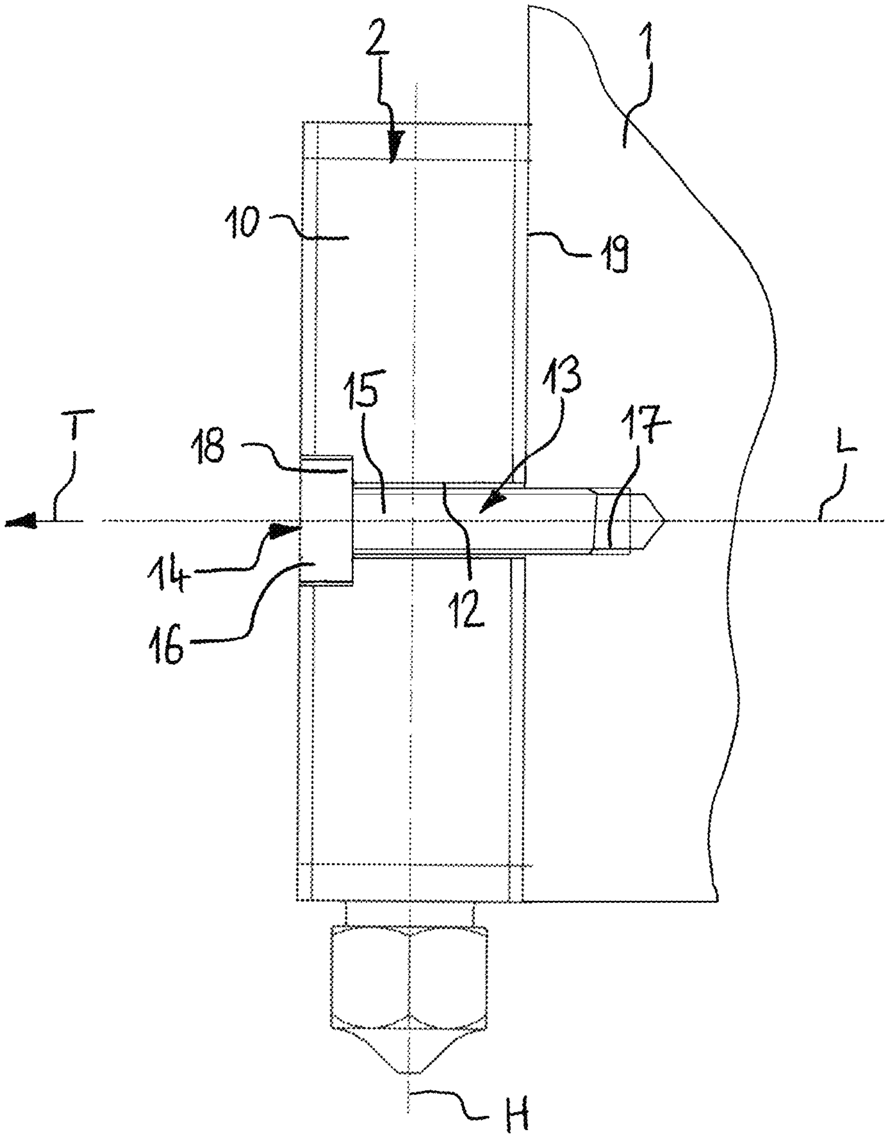
FIG. 3 is a side view of one of the dispensing modules according to FIG. 2.

FIG. 2 shows a front view of two dispensing modules 2, 2' arranged directly next to each other. FIG. 3 shows a side view of one of the two dispensing modules 2 shown in FIG. 2. Both FIGS. 2 to 3 are described together in the following. Representative of all the dispensing modules of the dispenser, which are all of identical design, the dispensing module 2 shown on the left in FIG. 2 is described in more detail. Features of the dispensing module 2' shown on the right in FIG. 2 which correspond to features of the dispensing module 2 on the left are marked with the same reference numbers supplemented by an apostrophe.

The dispensing module 2 has a first side surface 9 arranged on the left in FIG. 2 and a second side surface 10 arranged on the right in FIG. 2, both of which are arranged perpendicular to the lateral axis Q. The dispensing module 2 shown in FIG. 2 on the left has its second side surface 10 in contact with the first side surface 9' of the dispensing module 2' shown on the right. In the row of dispensing modules 2, 2' shown in FIG. 1, a first side surface of one dispensing module is in contact with a second side surface of another adjacent dispensing module.

The dispensing module 2 has a groove-shaped first recess 11 in the first side surface 9. A groove-shaped second recess 12 is arranged in the second side surface 10. In the embodiment example shown, the recesses 11, 12 are semi-cylindrical in shape and extend parallel to the longitudinal axis L of the dispenser, i.e., transverse to the lateral axis Q. Alternatively, the recesses 11, 12 may also have a different cross-sectional shape, such as circular segment-shaped or rectangular, as long as they are open towards the respective immediately adjacent dispensing module 2, 2'. Thus, as shown in FIG. 2, the second recess 12 of the dispensing module 2 shown on the left together with the first recess 11' of the dispensing module 2' shown on the right together form a channel-like fastening aperture 13 parallel to the longitudinal axis L, the fastening aperture 13 being cylindrical in shape.

As can be seen in FIG. 3, a bolt in the form of a screw 14 is located in the fastening aperture 13. The screw 14 has a threaded shank 15 which passes through the fastening aperture 13 and is screwed into a threaded bore 17 of the base body 1. On a side facing away from the base body 1, the screw 14 has a screw head 16 which is axially clamped against clamping surfaces 18 facing away from the base body 1 of the two dispensing modules 2 forming the fastening aperture 13. This clamping causes a fastening surface 19 of the two dispensing modules 2 forming the fastening aperture 13 to be clamped against and in contact with the base body 1. This serves in particular the temperature transition between the heated base body 1 and a housing of the dispensing module 2. As can be seen in FIG. 1, end modules 4, 5 are arranged at the ends of the row of dispensing modules 2, which have a recess facing the respective adjacent one of the dispensing modules in order to form a fastening aperture together with the recess of the adjacent one of the dispensing modules. The end modules 4, 5 are additionally firmly connected to the base body 1 by fastening means (not shown).

Figure 4:
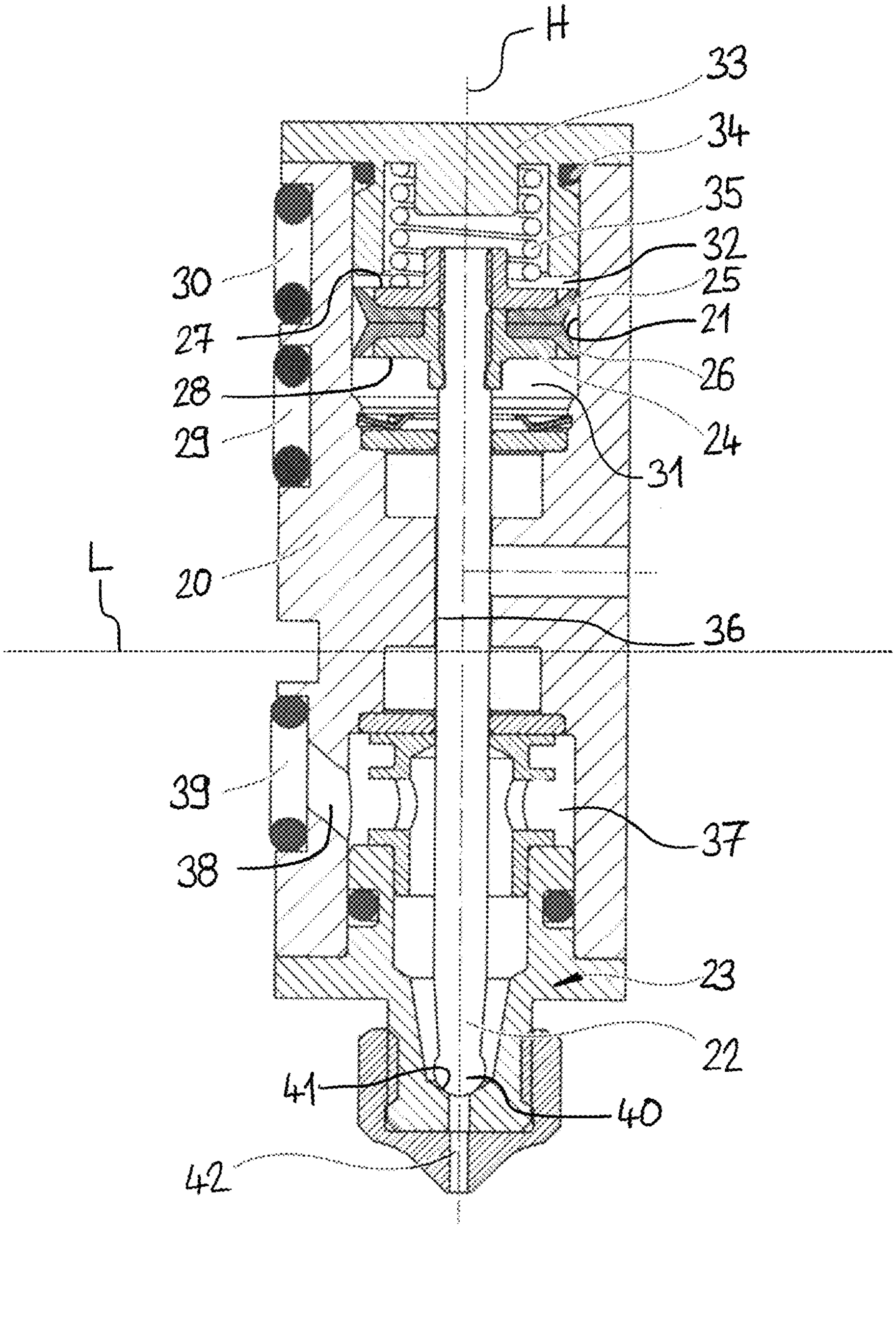
FIG. 4 is a front, cross-sectional view of the dispensing module as shown in FIG. 3.

FIG. 4 shows a longitudinal section of the dispensing module according to FIG. 3. The dispensing module comprises a housing 20 in which a piston-cylinder unit is arranged. The piston-cylinder unit has a cylinder represented by a cylinder bore 21 within the housing 20. The term "cylinder bore" does not mean that the bore must be in the form of a circular cylinder with a circular cross-section. The cylinder bore 21 may also have a cross-section that is elongated in shape, wherein the cylinder bore 21 has a greater extension in the direction of a longitudinal axis L, for example, than in the direction of a lateral axis Q, wherein the longitudinal axis L and the lateral axis Q are arranged perpendicular to one another and perpendicular to the vertical axis H in the embodiment example shown. The cylinder bore 21 originates from an upper surface of the housing 20 and extends into the depth of the housing 20 in the direction of a vertical axis H.

The piston-cylinder unit is used to actuate a nozzle needle 22, which is axially adjustable along the vertical axis H within the housing 20. An outlet nozzle 23 for the viscous material, in this case for a hot melt adhesive, is further provided on the housing 20. The nozzle needle 22 is used to open and close the outlet nozzle 23.

The piston cylinder unit represents an actuating device for the nozzle needle 22. The piston-cylinder unit further comprises a piston 24, which is adapted to the inner contour of the cylinder bore 21 and is guided in the cylinder bore 21 so as to be axially adjustable along the vertical axis H. Two sealing rings 25, 26 are used between the piston 24 and the inner surface of the cylinder bore 21 to seal the piston 24 from the cylinder bore 21. The piston 24 has an upper piston surface 27 and a lower piston surface 28, each of which can be acted upon by compressed air force. The piston-cylinder unit is therefore designed as a pneumatic actuator. In principle, however, it is also conceivable that the actuator is a hydraulic actuator. An air inlet 29 for opening and an air inlet 30 for closing the outlet nozzle 23 are used to pressurize the piston surfaces 27, 28, wherein the air inlet 29 for opening is connected to a first cylinder chamber 31 for pressurizing the lower piston surface 27. The air inlet 30 for closing is connected to a second cylinder chamber 32, which is used to pressurize the upper piston surface 27.

In the orientation of the housing 20 shown in FIG. 4, the cylinder bore 21 is closed at the top by a cover 33, which sits sealed in the cylinder bore 21 by means of sealing rings 34 and is secured to the housing 20 by fastening screws (not shown). A spring element 35 is arranged in the cover 33. The spring element 35 has one end abutting against the cover 33 and the other end abutting against the piston 24 and acting on the piston 24 in the direction towards a closed position for closing the outlet nozzle 23. This ensures that the outlet nozzle 23 is closed even in the event of a pressure loss in the cylinder chambers 31, 32.

The nozzle needle 22 is firmly connected to the piston 24 and is axially displaced by the piston 24. The nozzle needle 22 is guided through a needle channel 36 inside the housing 20 and extends to the outlet nozzle 23, which is located on the side of the housing 20 facing away from the cover 33. Adjacent to the needle channel 36 is a nozzle chamber 37 through which the nozzle needle 22 also passes. The nozzle chamber 37 is in fluid communication, via a feed channel 38, with an inlet 39 for viscous material, in this case hot melt adhesive, and is supplied with hot melt adhesive via this. In a closed position of the piston 24, a tip 40 of the nozzle needle 22 is in contact with a nozzle needle seat 41 of the outlet nozzle 23, as shown in FIG. 4, so that an outlet channel 42 of the outlet nozzle 23 is closed. In an open position of the plunger 24, the nozzle needle 22 is axially displaced upward from the position shown in FIG. 4, with the tip 40 lifted from the nozzle needle seat 41 so that the exit passage 42 is in fluid communication with the nozzle chamber 37 and the feed channel 38 and so that the hot melt adhesive can be conveyed from the inlet 39, through the feed channel 38 and the nozzle chamber 37 and out of the exit passage 42.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A dispenser for applying a viscous material to a substrate, comprising:

a base body; and a plurality of dispensing modules arranged side by side in series along a lateral axis of the dispenser and attached to the base body, wherein the dispensing modules each have at least one recess formed in a side face of the respective dispensing module and being open towards an adjacent dispensing module along an entire width of the side face in a direction transverse to the lateral axis and forming, together with a recess of an adjacent dispensing module, a channel-like fastening aperture extending along the entire width of the side face, and wherein in each of the fastening apertures a bolt is seated, the bolt is fastened to the base body and is supported on a side of the dispensing modules facing away from the base body against both dispensing modules forming the respective fastening aperture.

2. The dispenser according to claim 1, wherein each of the bolts is designed as a screw which is screwed into a threaded bore of the base body and has a screw head with which the screw is supported against the dispensing modules on the side of the dispensing modules facing away from the base body.

3. The dispenser according to claim 1, wherein adjacent two of the plurality of dispensing modules have mutually facing side surfaces, the recesses being arranged in the mutually facing side surfaces.

4. The dispenser according to claim 1, wherein the plurality of dispensing modules each have two recesses which face away from one another.

5. The dispenser according to claim 1, wherein the fastening apertures are cylindrical in shape.

6. The dispenser according to claim 1, wherein the recesses are semi-cylindrical in shape.

7. The dispenser according to claim 1, wherein the plurality of dispensing modules each have a fastening surface with which the dispensing modules are held in contact with the base body.

8. The dispenser according to claim 1, wherein an end module is fastened to the base body at each end of the row of dispensing modules.

9. The dispenser according to claim 1, wherein the end modules each have a recess which forms a fastening aperture with one of the recesses of the respective adjacent dispensing modules.

10. The dispenser according to claim 9, wherein the end modules each have a fastening hole in which a fastening screw is seated, which is screwed into a threaded bore on the base body.

11. The dispenser according to claim 1, wherein the bolts pass through the fastening apertures in the direction transverse to the lateral axis.

12. The dispenser according to claim 1, wherein the viscous material is a hot melt adhesive.

13. The dispenser according to claim 1, wherein only one bolt is seated in each of the fastening apertures.

14. A dispenser for applying a viscous material to a substrate, comprising:

a base body; and a plurality of dispensing modules arranged side by side in series along a lateral axis of the dispenser and attached to the base body, wherein the dispensing modules each have at least one recess formed in a side face of the respective dispensing module and being open towards an adjacent dispensing module and forming, together with a recess of an adjacent dispensing module, a fastening aperture extending in a direction transverse to the lateral axis, and wherein in each of the fastening apertures only one bolt is seated, the bolt is fastened to the base body and is supported on a side of the dispensing modules facing away from the base body against both dispensing modules forming the respective fastening aperture.

* * * * *